US009348788B2

(12) United States Patent
Farmer et al.

(10) Patent No.: US 9,348,788 B2
(45) Date of Patent: May 24, 2016

(54) REAL-TIME ASYNCHRONOUS EVENT AGGREGATION SYSTEMS

(71) Applicant: YAHOO! INC., Sunnyvale, CA (US)

(72) Inventors: F. Randall Farmer, Palo Alto, CA (US); Mohammad Mohsenzadeh, Palo Alto, CA (US); Chip Morningstar, Palo Alto, CA (US); Neal J. Sample, Santa Cruz, CA (US)

(73) Assignee: YAHOO! INC., Sunnyvale, CA (US)

( * ) Notice: Subject to any disclaimer, the term of this patent is extended or adjusted under 35 U.S.C. 154(b) by 0 days.

(21) Appl. No.: 14/290,072

(22) Filed: May 29, 2014

(65) Prior Publication Data

US 2014/0280227 A1 Sep. 18, 2014

Related U.S. Application Data

(63) Continuation of application No. 11/945,911, filed on Nov. 27, 2007, now Pat. No. 8,849,909, which is a continuation-in-part of application No. 11/774,460, filed on Jul. 6, 2007, now Pat. No. 7,937,468.

(51) Int. Cl.
*G06F 15/16* (2006.01)
*G06Q 10/06* (2012.01)
(Continued)

(52) U.S. Cl.
CPC .......... *G06F 15/16* (2013.01); *G06F 17/30867* (2013.01); *G06Q 10/06* (2013.01); *G06Q 30/02* (2013.01); *H04L 12/585* (2013.01); *H04L 51/12* (2013.01); *G06Q 10/10* (2013.01); *H04L 12/581* (2013.01); *H04L 29/06* (2013.01); *H04L 29/06027* (2013.01); *H04L 29/08072* (2013.01); *H04L 67/1057* (2013.01)

(58) Field of Classification Search
CPC .............................. G06F 15/173; G06F 15/16
USPC ......................................... 709/204, 206, 225
See application file for complete search history.

(56) References Cited

U.S. PATENT DOCUMENTS 6,892,178 B1 * 5/2005 Zacharia ................ G06Q 10/04
705/7.29
7,467,206 B2 * 12/2008 Moore et al. .................. 709/225
(Continued)

OTHER PUBLICATIONS

Engilsh et al., "Gathering Experience in Trust-Based Interactions", 2006.*
(Continued)

*Primary Examiner* — O. C. Vostal
(74) *Attorney, Agent, or Firm* — James J. DeCarlo; Greenberg Traurig, LLP

(57) ABSTRACT

A real-time asynchronous event aggregation system, method, and network device are configured to capture real-time asynchronous events, and to pass them as input to one or more aggregation engines to determine a reputation for a target. The aggregation engine(s) may then send out notifications where a reputation category changes for a target, indicating that an action may be taken to inhibit spam messages from the target, highlight a display of content from the target, or the like. As such, the event-driven aggregation engines may be designed to capture real-time asynchronous events, such as reputation reports for a wide variety of activities, including, but not limited to spam and/or not-spam messages, determining a reputation on a posting of comments to a movie, a blog posting, a play list posting, or the like. In one embodiment, a reputation of the sender of the reputation event may also be determined.

20 Claims, 7 Drawing Sheets

(51) Int. Cl.
*G06Q 30/02* (2012.01)
*H04L 12/58* (2006.01)
*G06F 17/30* (2006.01)
*G06Q 10/10* (2012.01)
*H04L 29/06* (2006.01)
*H04L 29/08* (2006.01)

(56) References Cited

U.S. PATENT DOCUMENTS

| | | | | |
|---|---|---|---|---|
| 7,668,951 | B2* | 2/2010 | Lund | G06Q 10/107 709/204 |
| 7,860,928 | B1* | 12/2010 | Anderson | H04L 51/04 709/204 |
| 7,953,814 | B1* | 5/2011 | Chasin | H04L 12/585 709/207 |
| 8,214,497 | B2* | 7/2012 | Alperovitch et al. | 709/226 |
| 8,221,238 | B1* | 7/2012 | Shaw | A63F 13/12 463/29 |
| 8,561,167 | B2* | 10/2013 | Alperovitch et al. | 726/13 |
| 8,880,611 | B1* | 11/2014 | Lim et al. | 709/206 |
| 2004/0128155 | A1* | 7/2004 | Vaidyanathan et al. | 705/1 |
| 2004/0177120 | A1* | 9/2004 | Kirsch | 709/206 |
| 2006/0042483 | A1* | 3/2006 | Work et al. | 101/91 |
| 2006/0059238 | A1* | 3/2006 | Slater | G06Q 10/107 709/206 |
| 2006/0111960 | A1* | 5/2006 | Chess | G06Q 10/06 705/7.29 |
| 2006/0149708 | A1* | 7/2006 | Lavine | 707/3 |
| 2006/0253581 | A1* | 11/2006 | Dixon et al. | 709/225 |
| 2007/0027992 | A1* | 2/2007 | Judge | G06Q 10/107 709/227 |
| 2007/0078936 | A1* | 4/2007 | Quinlan | G06Q 10/107 709/206 |
| 2007/0294339 | A1* | 12/2007 | Ala-Kleemola | G08Q 10/00 709/203 |
| 2008/0046314 | A1* | 2/2008 | Chung | G06Q 30/02 705/14.51 |
| 2008/0059348 | A1* | 3/2008 | Glassman et al. | 705/35 |
| 2008/0120166 | A1* | 5/2008 | Fernandez | G06Q 30/02 702/179 |
| 2008/0249788 | A1* | 10/2008 | Heller | G06Q 40/06 705/1.1 |
| 2009/0007102 | A1* | 1/2009 | Dadhia | G06F 21/566 718/1 |
| 2010/0005291 | A1* | 1/2010 | Hulten | G06F 21/56 713/156 |
| 2013/0041955 | A1* | 2/2013 | Chasin | H04L 51/12 709/206 |

OTHER PUBLICATIONS

Garg et al., "D4.1 Trust and Reputation Management System Definition", "BIONETS", 2007.*
Liu, "A New Trust-Based Electronic Exchange System", 2006.*

* cited by examiner

REAL-TIME ASYNCHRONOUS EVENT AGGREGATION SYSTEMS

CROSS REFERENCE TO RELATED APPLICATIONS

This application is a continuation of U.S. Non-Provisional application Ser. No. 11/945,911, filed on Nov. 27, 2007, now U.S. Pat. No. 8,849,909, and entitled "Real-time Asynchronous Event Aggregation Systems" which is a Continuation-In-Part patent application of U.S. patent application Ser. No. 11/774,460, filed Jul. 6, 2007, entitled "Detecting Spam Messages Using Rapid Sender Reputation Feedback Analysis," and claims the benefit under 35 U.S.C. §120, the entireties of these applications is further incorporated herein by reference.

TECHNICAL FIELD

The present invention relates generally to computer systems, and more particularly, but not exclusively, to a system and method for a computing architecture useable to manage real-time asynchronous events, such as reputation events.

BACKGROUND

The Internet has provided new opportunities for people to interact with strangers. These interactions can often be fun, informative, and even profitable. However, they may also involve risks. For example, just how reliable is the advice located on the Internet from a self-proclaimed expert? Can one really trust that a given business on the Internet will provide the product as described? Is this product, movie, or hotel, something of value? Can the author's opinion be trusted? Is it reliable?

Before the Internet, such questions could be answered through a reputation of the other party, often obtained from more trusted friends, family, co-workers, or the like. Businesses, experts, and so forth may also have provided input on whether such opinions could be trusted. Others, such as the Better Business Bureau, and the like, provided information about personal experiences, complaints, and other gossip about which business or expert one could rely upon, and whether this is a product that may be of actual value. However, seeking out such sources for their opinions on a particular article, product, or the like, often may take a significant amount of time. Moreover, a person might want to seek opinions from several sources, to cross check, and better weigh the opinions obtained. Again, this may take a significant amount of time and resources to obtain reasonable opinions. It becomes more difficult, where the searcher may not be familiar with sources that can evaluate and provide an opinion on a particular subject, let alone, finding a person that might be able to provide an opinion about how reliable another person's comments might be. Thus, there is a desire to quickly determine a reputation of a person, product, article, or the like.

The issue of obtaining opinions about internet material becomes even more complex when one considers massive mailings, such as might occur during sending of notices or advertisements by a legitimate business, church, or the like, versus mailings that might be spam. Thus, there is a desire to quickly determine whether the mailings are reputable; whether an author of content is reputable; whether the content; whether a product, and/or a service is reputable; and to take action to block the less reputable content, product, service, author, and/or even a source of the reputation event. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Descriptions, which is to be read in association with the accompanying drawings, wherein.

DETAILED DESCRIPTION OF THE INVENTION

Figure 1:
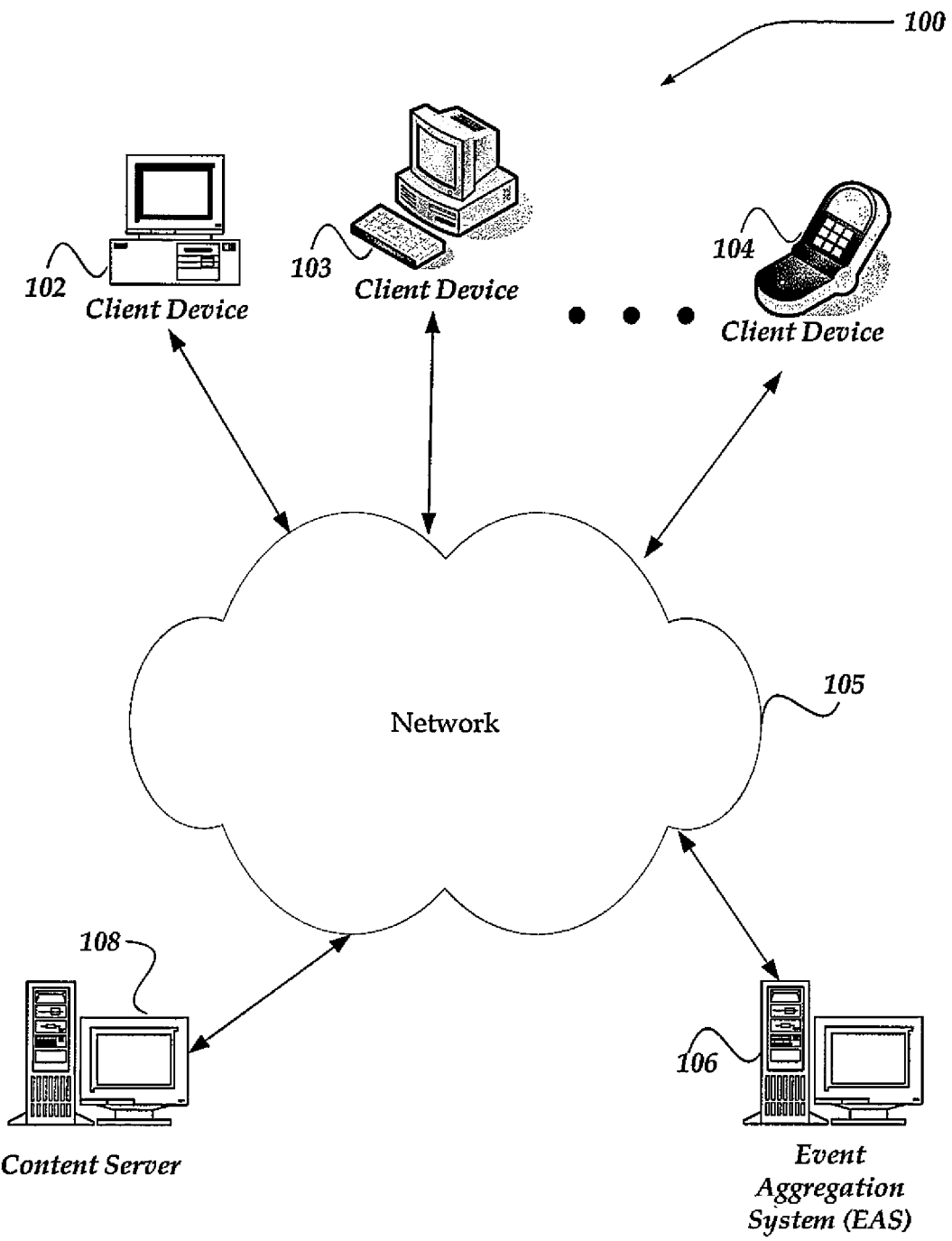
FIG. 1 shows a functional block diagram illustrating one embodiment of an environment for use in managing reputations.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly, the present invention is directed towards a real-time asynchronous event aggregation system. The system is configured to capture real-time asynchronous events, and to pass them as input to one or more components within the system, known as models, to be executed. The results of the models are then made available through a querying component of the system or through real-time asynchronous notifications. One aspect of the model is that inputs or events may be received and processed in an asynchronous fashion. While this feature will be made more apparent below, briefly, this means that as each event is received by the system, an operation may be performed, independent of receiving a return, and absent of wait states. Thus, although multiple events might be receivable as inputs, the system may immediately perform actions based on receiving any one of the event inputs, independent of receiving the other event inputs. The system need not wait until all of the event inputs are received to determine a result output. As such, actions within the system may be performed asynchronously, independent of when other events are received. Moreover, because the system is configured to operate asynchronously, there need not be a wait mode within the system where an output is not provided until all of the other event inputs are received.

One application of the event-driven aggregation system includes building of reputation platforms, where the input events are reputation events, sometimes called statements, which may include a source, context, target, and/or claim. As a reputation platform, rules and various asynchronous computations may be performed to determine a reputation score for a given target. The reputation platform may then send out notifications where a reputation category changes for a target, or the like.

Thus, the event-driven aggregation system is designed to capture real-time asynchronous events, such as reputation reports for a wide variety of activities, including, but not limited to spam and/or not-spam messages, determining a reputation on a posting of comments to a movie, a blog posting, a play list posting, or virtually any other content posting, service, product, or the like. Thus, the architecture of the event-driven aggregation system is configured to be applicable to virtually any problem where capturing real-time asynchronous events and determining a result is desirable. Therefore, although reputations are described below as one application for the aggregation system, it should be noted that the scope of the invention is not so limited, and other applications are envisaged.

Illustrative Environment

FIG. 1 is a functional block diagram illustrating an exemplary operating environment 100 in which the invention may be implemented. Operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes client devices 102-104, network 105, content server 108, and Event Aggregation System (EAS) 106. Client devices 102-104 are in communication with each other, content server 108, and EAS 106 through network 105.

Client devices 102-104 may include virtually any computing device capable of receiving and sending a message over a network, such as network 105, to and from another computing device. The set of such devices described in one embodiment below generally includes computing devices that are usually considered more specialized devices with limited capabilities and typically connect using a wireless communications medium such as cell phones, smart phones, pagers, radio frequency (RF) devices, infrared (IR) devices, Citizen's-Band Radios (CBs), integrated devices combining one or more of the preceding devices, or virtually any mobile device, and the like. However, the set of such devices may also include devices that are usually considered more general purpose devices and typically connect using a wired communications medium at one or more fixed location such as laptop computers, personal computers, multiprocessor systems, microprocessor-based or programmable consumer electronics, network PCs, and the like. Similarly, client devices 102-104 may be any device that is capable of connecting using a wired or wireless communication medium such as a personal digital assistant (PDA), POCKET PC, wearable computer, and any other device that is equipped to communicate over a wired and/or wireless communication medium.

Each client device within client devices 102-104 may include an application that enables a user to perform various operations. For example, each client device may include one or more messenger applications that enables the client device to send and receive messages to/from another computing device employing various communication mechanisms, including, but not limited to Short Message Service (SMS), Multimedia Messaging Service (MMS), Instant Messaging (IM), internet relay chat (IRC), Mardam-Bey's internet relay chat (mIRC), Jabber, email, and the like.

Client devices 102-104 also may include at least one other client application that is configured to include a capability to provide and receive textual content, multimedia information, or the like. The client application may further provide information that identifies itself, including a type, capability, name, or the like. In one embodiment, mobile devices 102-104 may uniquely identify themselves through any of a variety of mechanisms, including a phone number, Mobile Identification Number (MIN), an electronic serial number (ESN), network address, or other device identifier. The information may also indicate a content format that the client device is enabled to employ. Such information may be provided in a message, or the like, sent to, or other computing devices.

In one embodiment, client devices 102-104 may receive messages from a message service, such as might be provided by EAS 106, content server 108, another network device (not illustrated), or the like. Users of client devices 102-104 may determine that a received message is spam, or not spam (ham). In one embodiment, the user may select to provide such indication that the received message is spam or not spam to another device, such as EAS 106, content server 108, or the like. Such indications may be performed by clicking on an icon, button, or the like, within or otherwise associated with a messaging client application. In one embodiment, the user might send the indication as another message to EAS 106 content server 108, or the like. Such indications may be referred to a reputation event, as they provide a comment on the reputation of the sender of the message. In one embodiment, the sender of the message might be identified by a network address, such as an Internet Protocol (IP) address, or the like.

Client devices 102-104 may be further configured with a browser application that is configured to receive and to send content in a variety of forms, including, but not limited to markup pages, web-based messages, audio files, graphical files, file downloads, applets, scripts, text, and the like. The browser application may be configured to receive and display graphics, text, multimedia, and the like, employing virtually any markup based language, including, but not limited to a Handheld Device Markup Language (HDML), such as Wireless Markup Language (WML), WMLScript, JavaScript, and the like, Standard Generalized Markup Language (SGML), HyperText Markup Language (HTML), Extensible Markup Language (XML).

As with received messages, a user of client devices 102-104 might also provide comments, ratings, or other value judgments about the content viewed over the network. For example, the user might view an article, a blog page, an advertisement, a product, obtain a service, or the like, from content server 108, or even access and download various content, including, but not limited to music, documents, graphical files, video files, or the like. The user may also view a movie theatre, visit a restaurant, or experience a product and/or service available through other than content server 108. The user may then provide the comment or other value judgment about the content, product, service, or the like, using content server 108. Such comment might be configured and organized, in one embodiment, in the form of a reputation statement or reputation event.

Figure 6:
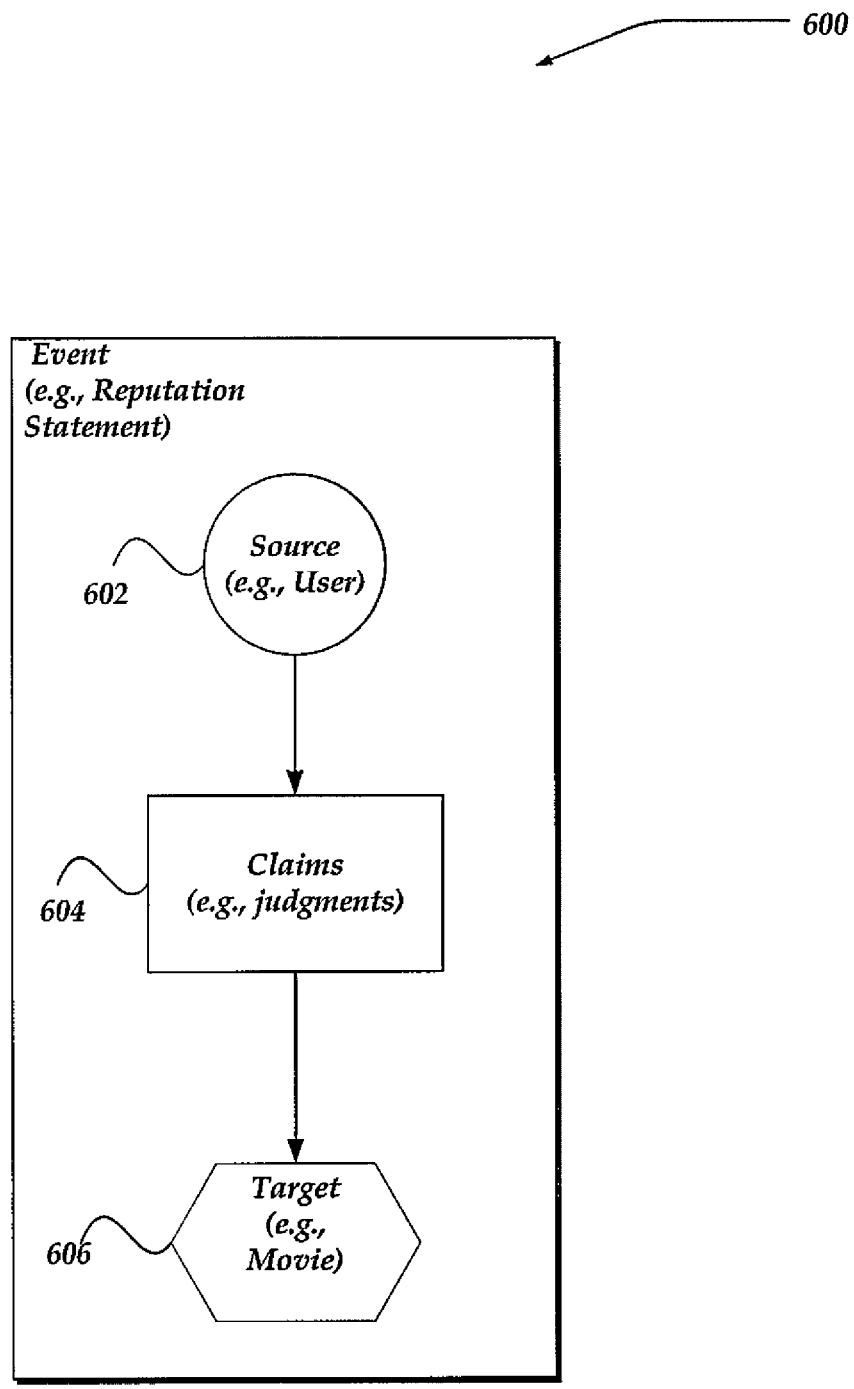
FIG. 6 shows one embodiment of a conceptual block diagram of an example of a reputation event.

FIG. 6 shows one embodiment of a conceptual diagram of an example of a reputation event, or generally, an event. As shown in FIG. 6, event 600 represents a reputation statement or reputation event that includes a source 602, claims 604, and target 606. Thus, as illustrated, event 600 represents a statement regarding a value judgment, comment, or claim by source 602 about target 606.

In one embodiment, source 602 includes an identifier indicating the source of event 600. In one embodiment, the identifier might be provided by the user as part of inputting and sending the reputation event. However, in another embodiment, the identifier might be automatically included such as might occur during preparation of a message (e.g., a return address), or the like. In one embodiment, the identifier might also be obtained automatically based on a network address, user identifier, user account, or the like, obtained when the user logs in to provide the event 600, or sends the message, or the like. In one embodiment, a cookie might even be used to determine source 600's identifier. Target 606 might include virtually any entity for which the claim 604 is about, including a message, a book, album, news article, music, video, board post, a product, a service, a location, merchant, or other business, another review, or so forth. In addition, target 606 might include additional information including an identifier of the target, based on a category, a location, a landmark, an occurrence, or the like. It should be noted further, that target 606 may include sub-sets of targets. For example, target 606 might include information about a source of a message, as well as information about the message itself. In one embodiment, target 606 might include information about an author of content that is posted to a blog site, or other site, such as might be hosted by content server 108, as well as information about the content, a subject of the content, or the like.

Claim 604 may include comments and/or ratings from source 602 about target 606. A comment may include qualitative elements and may be stored as text in a file, a message, a database, directory, or the like. Claim 604 may include a rating that may also include a quantitative element, employing a variety of mechanisms, including grades, stars, a score, or the like. For example, in one embodiment, claim 604 might be a judgment that a message from target 606 is spam or not spam.

It should be noted, that while event 600 represents one structure of a representation event or statement, the implementation is not limited to such structure, and other structures may readily be used, including a free form structure, form inputs, a table, or the like.

Returning to FIG. 1, network 105 is configured to couple client devices 102-104, with each other, and/or other network devices. Network 105 is enabled to employ any form of computer readable media for communicating information from one electronic device to another. In one embodiment, network 105 is the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 105 may further employ a plurality of wireless access technologies including, but not limited to, 2nd (2G), 3rd (3G), 4th (4G) generation radio access for cellular systems, Wireless-LAN, Wireless Router (WR) mesh, and the like. Access technologies such as 2G, 3G, and future access networks may enable wide area coverage for network devices, such as client device 204, and the like, with various degrees of mobility. For example, network 105 may enable a radio connection through a radio network access such as Global System for Mobil communication (GSM), General Packet Radio Services (GPRS), Enhanced Data GSM Environment (EDGE), Code Division Multiple Access (CDMA), Wideband Code Division Multiple Access (WCDMA), or the like.

Furthermore, remote computers and other related electronic devices could be remotely connected to either LANs or WANs via a modem and temporary telephone link. In essence, network 105 includes any communication method by which information may travel between client devices 102-104, EAS 106, and/or content server 108.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Content server 108 includes virtually any network computing device that is configured to provide various resources, including content and/or services over network 105. Content server 108 may provide content and/or services for any of a variety of activities, including, but not limited to merchant businesses, financial businesses, insurance businesses, educational, governmental, medical, products, and/or services, or virtually any other content of interest. Content server 108 might also provide access for various forms of content including, but not limited to music, blogs, videos, or the like. In one embodiment, content server 108 might be configured to provide an interface for a user to provide comments about content hosted by content server 108. In one embodiment, content server 108 may also provide an interface useable to provide comments about content, products, services, or the like, available from other than content server 108.

Furthermore, in one embodiment, content server 108 may be configured to send a message to one or more of client devices 102-404 that includes a link to a web page hosted within content server 108. Moreover, content server 108 may select to send a plurality of messages, bulk messages, or the like, to client devices 102-104, including advertisements, or the like. In one embodiment, the messages might be viewed by at least one user as spam messages, while another user might view the message as other than spam. It should be noted that content server 108 is not the only possible source for spam (unsolicited, unwanted, messages). For example, it should be clear that such messages might also be sent by one or more of client devices 102-104.

In addition, content server 108 may also provide a messaging service, such as a list server, or the like. Thus, users of client devices 102-104 might send a message to a plurality of other users through services provided by content server 108, or the like. In one embodiment, the messages might therefore appear to be sent from content server 108 rather than from the user employing such service. Thus, in one embodiment, content server 108 might operate as a message forwarder, a submit server for an Internet Service Provider (ISP), or the like.

Moreover, content server 108 might be configured to operate behind a proxy server, network address translator (NAT), Enhanced Service Provider (ESP), or the like. In such configurations, an actual network address, such as an Internet Protocol (IP) address, or the like, might not be readily discernable.

Devices that may operate as content server 108 include, but are not limited to personal computers, desktop computers, multiprocessor systems, microprocessor-based or programmable consumer electronics, network PCs, servers, network appliances, and the like.

One embodiment of EAS 106 is described in more detail below in conjunction with FIGS. 2-5. Briefly, however, EAS 106 represents one embodiment of a real time event aggregation system. As such, EAS 106 includes virtually any network device that is configured to receive a reputation event and to asynchronously, in real-time, determine a reputation for an associated target of the reputation event. Thus, EAS 106 may be configured and arranged to determine based on inputs from, for example, client devices 102-104 whether a message from a target is spam, or not spam. In one embodiment, EAS 106 might be configured to classify the target into one of several possible classifications such as, for example, not spammer, spammer, or indeterminate. EAS 106 may then perform various actions based on the classification of the target, including, preventing another message to be sent to client devices 102-104, alerting an authority, administrator, or even users of target's reputation and activities.

In one embodiment, where the reputation event is about content provided by the target, EAS 106 might determine, based on a reputation classification, whether to allow the content to be displayed or not. For example, in one embodiment, where EAS 106 determines that content by the target is below a threshold reputation value, the content might be removed from content server 108, hidden from view of client devices other than the target, in addition to the target, or the like. In one embodiment, where the reputation of the target is above a threshold reputation value, EAS 106 might enable the target provider to receive a reward. Thus, for example, where the target provider provides blog inputs that receive high reputation values, EAS 106 might provide the target provider with money, discounts, coupons, or the like.

Although EAS 106 is illustrated as a distinct network device, the invention is not so limited. For example, a plurality of network devices may be configured to perform the operational aspects of EAS 106. In any event, devices that may operate as EAS 106 include, but are not limited to personal computers, desktop computers, multiprocessor systems, microprocessor-based or programmable consumer electronics, network PCs, servers, network appliances, and the like.

Illustrative Server Environment

Figure 2:
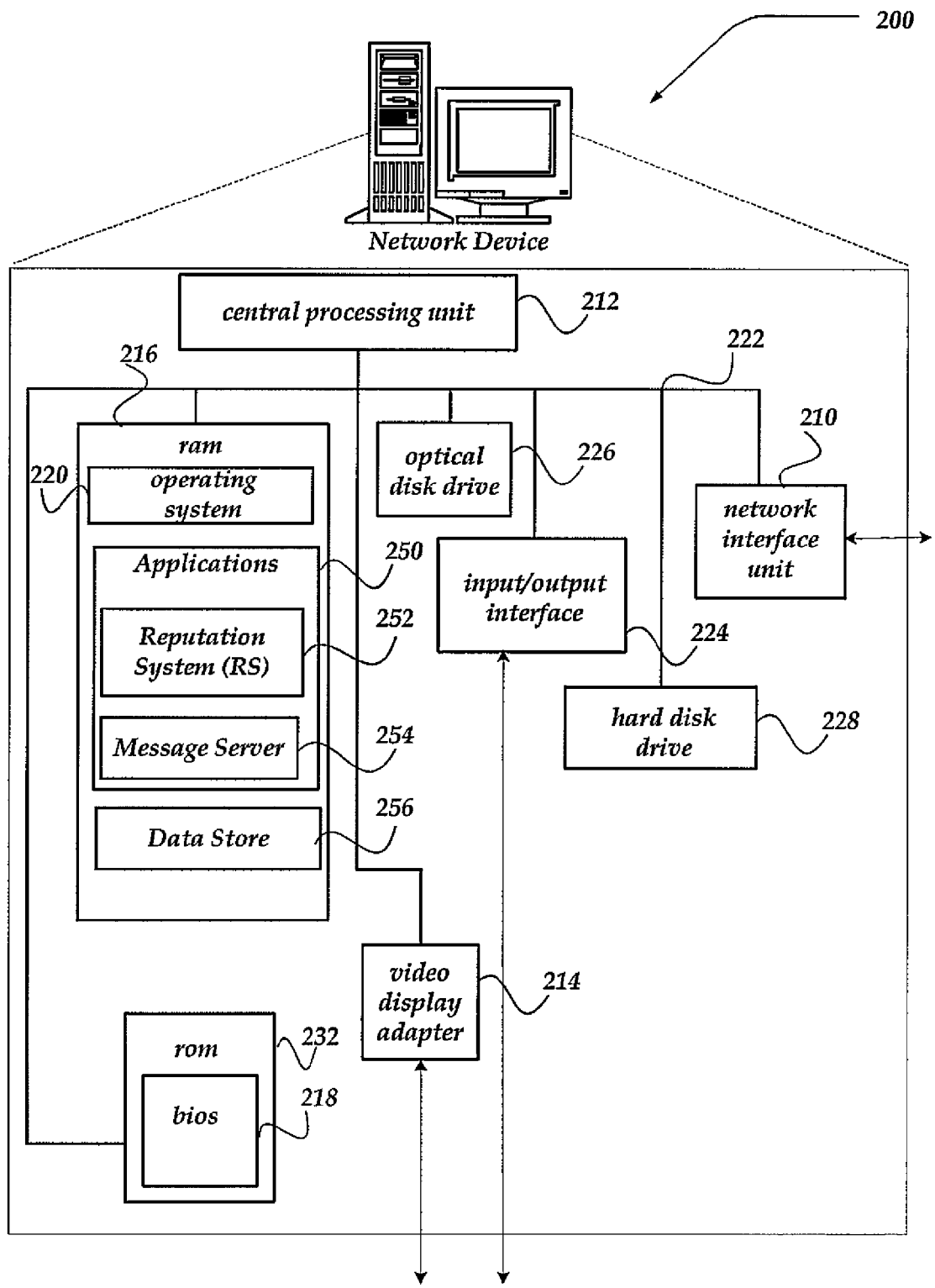
FIG. 2 shows one embodiment of a network device that may be employed within the environment illustrated in FIG. 1.

FIG. 2 shows one embodiment of a network device, according to one embodiment of the invention. Network device 200 may include many more or less components than those shown. The components shown, however, are sufficient to disclose an illustrative embodiment for practicing the invention. Network device 200 may, for example, represent EAS 106 of FIG. 1.

Network device 200 includes processing unit 212, video display adapter 214, and a mass memory, all in communication with each other via bus 222. The memory generally includes RAM 216, and ROM 232. Network device 200 also includes one or more mass storage devices, such as hard disk drive 228, tape drive, optical disk drive, and/or floppy disk drive. The memory stores operating system 220 for controlling the operation of network device 200. Any general-purpose operating system may be employed. Basic input/output system ("BIOS") 218 is also provided for controlling the low-level operation of network device 200. As illustrated in FIG. 2, network device 200 also can communicate with the Internet, or some other communications network, via network interface unit 210, which is constructed for use with various communication protocols including the TCP/IP protocol. Network interface unit 210 is sometimes known as a transceiver, transceiving device, network interface card (NIC), or the like.

Network device 200 may also include an SMTP handler application for transmitting and receiving email. Network device 200 may also include an HTTP handler application for receiving and handing HTTP requests, and an HTTPS handler application for handling secure connections. The HTTPS handler application may initiate communication with an external application in a secure fashion.

Network device 200 also may include input/output interface 224 for communicating with external devices, such as a mouse, keyboard, scanner, or other input devices not shown in FIG. 2. Likewise, network device 200 may further include additional mass storage facilities such as optical disk drive 226 and hard disk drive 228. Hard disk drive 228 is utilized by network device 400 to store, among other things, application programs, databases, or the like.

The memory and/or mass storage as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The memory also stores program code and data. One or more applications 250 are loaded into memory and run on operating system 220. Examples of application programs include schedulers, calendars, transcoders, database programs, word processing programs, spreadsheet programs, security programs, web servers, and so forth. Mass storage may further include applications such message server 254, Reputation System (RS) 252, and data store 256.

Data store 256 is configured and arranged to store and otherwise manage messages, statistical data, reputation reports, volume reports, or the like. Data store 256, however, is not limited to managing storage of these example items, and other items, data, information, or the like, may also be stored within data store 256, without departing from the scope of the invention. For example, data store 256 may also include user account information, policies, procedures or the like, useable for inhibiting delivery of spam, posting reputation computations, or the like. Moreover, data store 256 may be employed to maintain historical data, such as predictions, reputation reports, and the like, useable to generate a reputation report, a sender categorization model, or the like. Data store 256 may be implemented using a variety of technologies, including, but not limited to, folders, spreadsheets, data bases, scripts, applications, or the like. It should be noted that while data store 256 is illustrated with RAM 216, the invention is not so limited. Thus, data store 256 may also be stored, in part, or in whole, in one or more of optical disk drive 226, hard disk drive 228, or some other storage medium, including a storage medium within another network device.

Message server 254 may include virtually any computing component or components configured and arranged to forward messages from message user agents, and/or other message servers, or to deliver messages to a local message store, such as data store 256, or the like. Thus, message server 254 may include a message transfer manager to communicate a message employing any of a variety of email protocols, including, but not limited to, Simple Mail Transfer Protocol (SMTP), Post Office Protocol (POP), Internet Message Access Protocol (IMAP), NNTP, or the like.

However, message server 254 is not constrained to email messages, and other messaging protocols may also be managed by one or more components of message server 254. Thus, message server 254 may also be configured to manage SMS messages, IM, MMS, IRC, mIRC, or any of a variety of other message types.

In any event, message server 254 may be configured to provide reports indicating a variety of information about messages. Such reports may include information about a volume of messages received by users of message server 254, a volume of determined bulk messages received, information about messages received by known fake message addresses, Address book entries, or the like. Message server 254 might also provide user account information, user reputation information, or the like. In one embodiment, message server 254 might also configure and provide a fake message address useable to trap and report messages sent to the fake message address as spam messages.

RS 252 is described in more detail below in conjunction with FIGS. 3-5. Briefly, however, RS 252 is configured and arranged to operate as an asynchronous real-time reputation aggregation system. As such, RS 252 may receive, asynchronously, reputation events from a variety of sources, and to determine a reputation for one or more targets. In one embodiment, RS 252 may further enable a user, administrator, a content provider, a service provider, or the like, to perform a query to determine a reputation for a target. In one embodiment, RS 252 may provide notifications of changes in a reputation of a target, a classification of a target, or the like, such that various actions may be performed based on the determined reputation. For example, if the reputation for the target indicates that the target is providing untrustworthy content, such as abusive content on a blog site, spam messages to users, or the like, RS 252 might send a notification to message server 254 to request that additional messages from the target be blocked. In one embodiment, RS 252 may request that the content posted at a content server, or the like, be deleted, or otherwise hidden from view. In another embodiment, RS 252 may provide reputation information about a source of a reputation event, and/or a target, to content server 108. Content server 108, in one embodiment, may employ the reputations to perform various actions, including deleting content, hiding content, removing a user's account and/or authoring privileges, or the like. In one embodiment, content server 108 may further display at least some of the reputation information so that other visitors to the server may take actions based on the displayed reputations.

It should be noted that RS 252 may also provide notifications, and/or perform actions based on a target's reputation beyond those identified explicitly herein. Thus, such examples should not be construed as limiting the invention in any manner.

Illustrative Aggregation Platform

The following describes one embodiment of an implementation of a real time asynchronous aggregation platform useable by RS 252 of FIG. 2. It is noted that the invention is not limited to using such implementation platform, however. FIG. 3 shows a functional block diagram of one embodiment of a real time asynchronous aggregation platform useable for rapidly determining reputations based on reputation events within the environment illustrated in FIG. 1. Platform 300 may include many more or less components than those shown. The components shown, however, are sufficient to disclose an illustrative embodiment for practicing the invention.

As shown, platform 300 is designed to capture real time asynchronous events, pass them as input to one or more aggregation engines to be executed, and make results available by querying the platform or by sending real time asynchronous notifications. Platform 300 therefore, is configured to lend itself to a variety of applications where events are viewable as reputation events, usually specifying a source, context, target, and/or claim.

Figure 3:
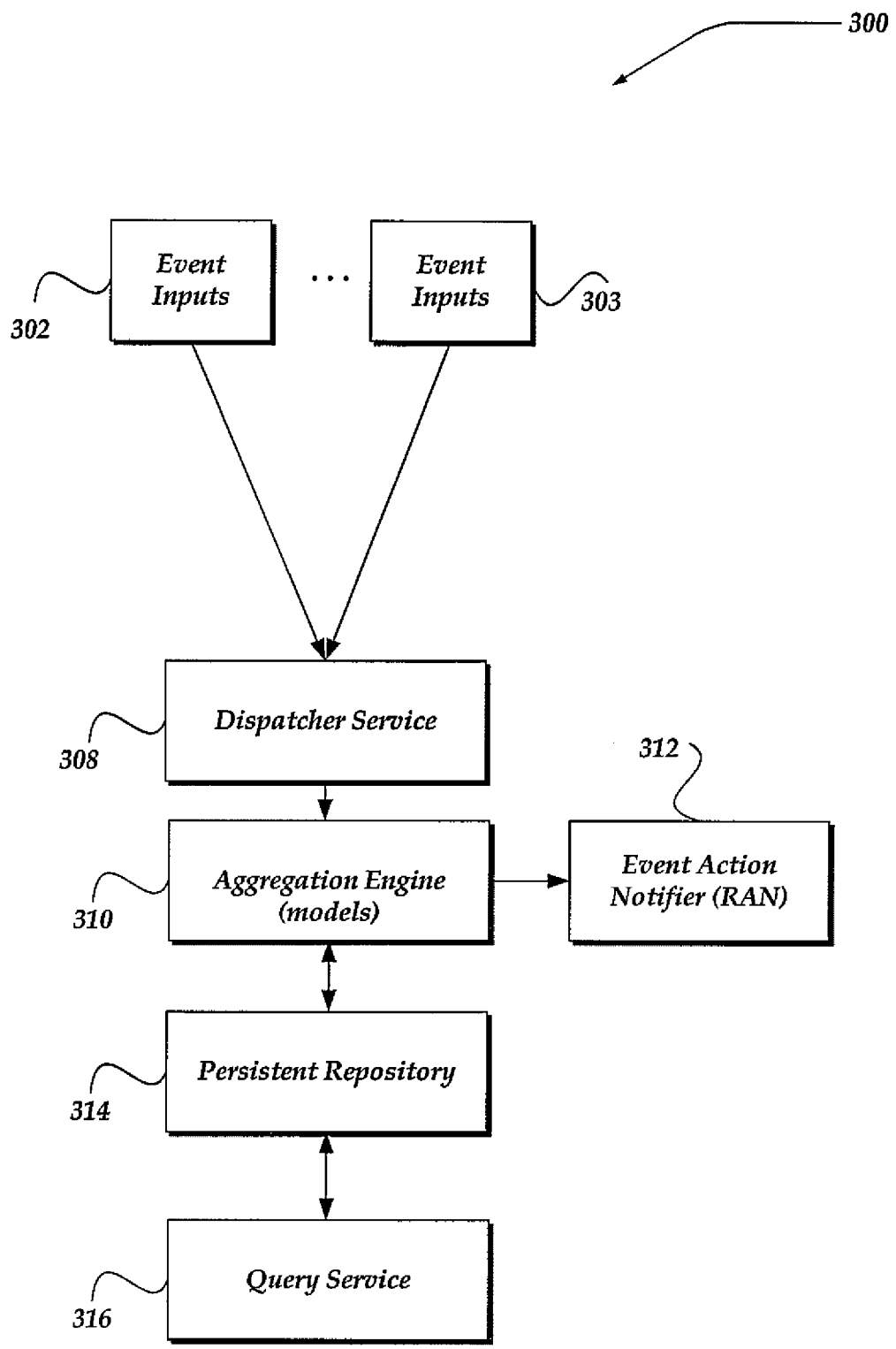
FIG. 3 shows a functional block diagram of one embodiment of a real time asynchronous aggregation platform useable for rapidly managing event aggregations.

As seen in FIG. 3, the platform includes events 302-303, dispatcher service 308, aggregation engine 310, persistent repository 314, query service 316, and event notifier 312.

Events 302-303 represent real time inputs into platform 300. They can be triggered explicitly by users, or triggered implicitly based on some action. They can also be triggered internally by a model within the platform, such as by aggregation engine 310, or event notifier 312, or the like. In one embodiment, the events can be sent to the same deployment, a remote deployment, or to a defined application. Events may be asynchronous in nature, which means that they may be sent by another device, and forgotten; indicating that, in one embodiment, platform 300 might not provide a response when receiving an event.

In one embodiment, the events may be specified using JavaScript Object Notation (JSON), however, the invention is not so constrained, and other specifications may also be employed. Events 302-303 may also be self-describing, being defined by the model application. Thus, each application model may define its own set of events. For example, as shown, events 302-303 represent inputs from a variety of sources, including but not limited to users, a message server, content server, SPAM trap server, or the like, or a variety of other sources. Events 302-303 may represent various reputation events, and include information such as described above in conjunction with FIG. 6.

In one embodiment, events 302-303 may include a name of the associated aggregation engine, a method within the aggregation engine that the event is destined for, aggregation engine specific parameters, or the like. Thus, in one embodiment, events may be received and dispatched to various aggregation engines.

Platform 300 may enable multiple transport protocols for receiving events 302-303. Thus, events 302-303 may be received over an asynchronous transaction stream (such as a reliable store and forward mechanism), via an asynchronous buffered transport (such as an unreliable mechanism) over HTTP using a web service, or virtually any other transport protocols, including mail protocols, TCP/IP, or the like.

Aggregation engine 310 is configured to process incoming events to rapidly determine in real-time reputation for at least a target, and, in one embodiment, also a source of the reputation event. In one embodiment, aggregation engine 310 provides a reputation classification that may be used to determine whether the target is likely to be a spammer, has an untrustworthy reputation, or the like. Such determination may then be sent as a notification to event notifier 312. Event notifier 312 may then, based on the notification, perform some action, such as blocking future messages from the sender (target), hiding content posted by the target, canceling an account, authoring privileges, or the like. One example of a process useable by aggregation engine 310 is described in more detail below in conjunction with FIG. 7.

Persistent Repository 314 is configured to implement, in one embodiment, a high performance, redundant and scalable data store. Aggregation engine 310 may employ persistent repository 314 to persist data across multiple invocations of Aggregation engine 310, or for sharing data between different aggregation engines. In one embodiment, aggregation engine 310 may perform actions to normalize at least some of the data, such that it may be readily employed across multiple aggregation engines.

In one embodiment, persistent repository 314 may be a partitioned, hashed key-value pair repository, using a primary key indexing scheme. However, for other queries, such as those using a secondary index, persistent repository 314 may, in one embodiment, provide a mechanism to send events to other external data stores.

Persistent repository 314 may be configured to scale horizontally by adding more partitions (such as through additional servers, for example), and to enable automatic migration of data from one partition to another partition. In one embodiment, the hashing algorithm may be configured to minimize an amount of migrations. Moreover, the partitions may be fully redundant by employing multiple servers per partition, and ensuring automatic replication of data between the servers.

In one embodiment, persistent repository 314 may use a domain to partition a target namespace. Moreover, in one embodiment, persistent repository 314 may append the target name to the domain to construct the primary key. Thus, in one embodiment, a domain/target may be employed as a unique identifier for storing attributes for a given target in a given domain namespace.

Notifications, such as a target's reputation classification, may be considered as an outgoing event generated by aggregation engines, such as aggregation engine 310. Such notifications may be sent asynchronously to notify another application, such as notifier 312, or the like, when a change of state occurs. Moreover, notifications can be used to populate a secondary data store, such as one useable to maintain a record of known spammers, or the like.

Query service 316 is configured and arranged to enable an administrator, user, or the like, to request specific information from persistent repository 314. In one embodiment, the query may employ REpresentation State Transfer for distributed hypermedia (RESTful) formats, while a response may be returned as JSON. However, the invention is not limited to these formats, and others may also be used, without departing from the scope of the invention.

Dispatcher service 308 is described in more detail below in conjunction with FIG. 4. Briefly, however, dispatcher service 308 is configured to receive incoming events, and to dispatch them to one or more aggregation engines to be processed. Dispatcher service 308 may, in one embodiment, employ a store and forward transactional mechanism to send events to an aggregation engine.

Dispatcher service 308 may support a variety of transports for incoming events, including reliable transactional transports, batch transports, HTTP via REST or SOAP formats, raw TCP, or UDP message formats, or the like.

Figure 4:
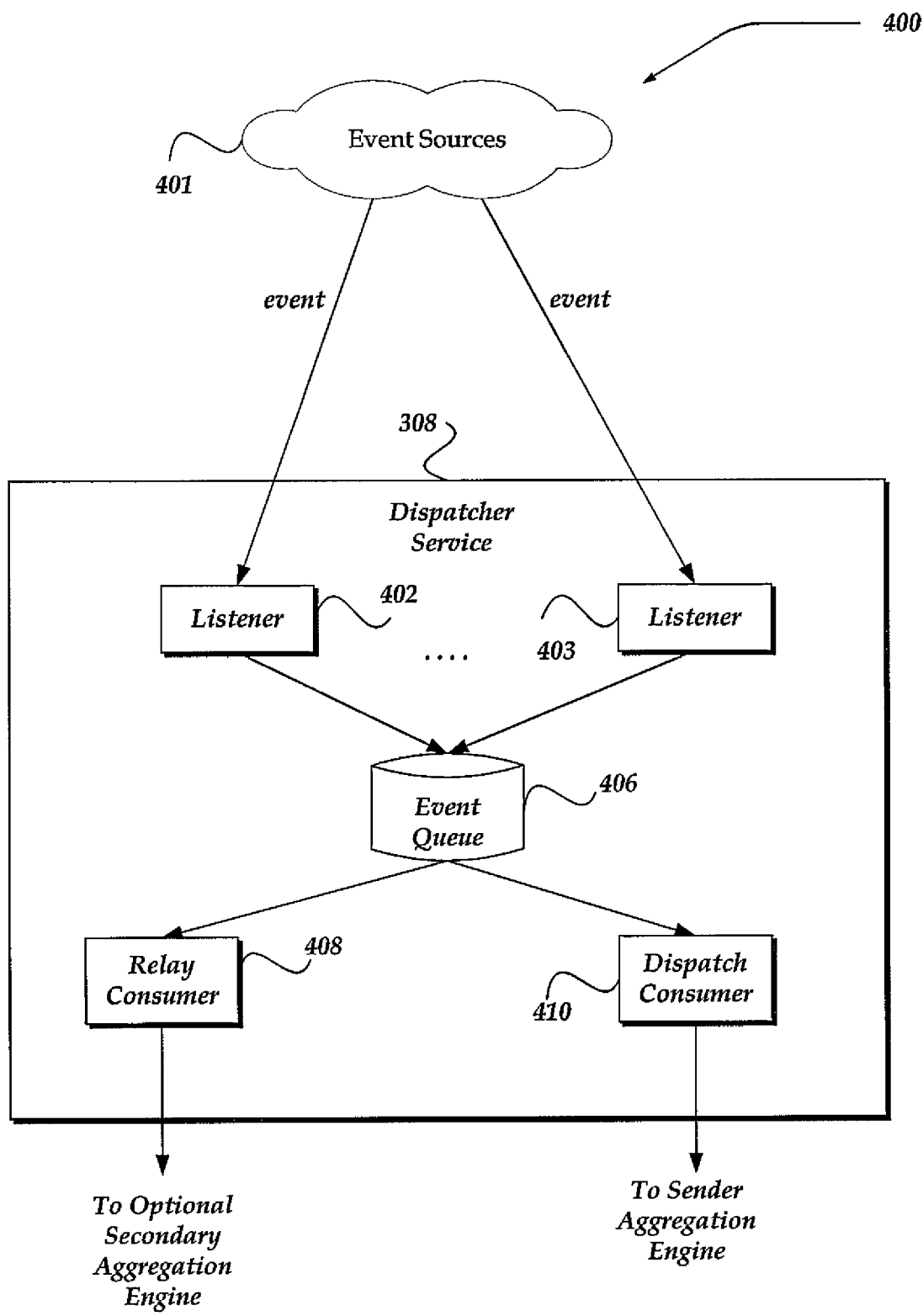
FIG. 4 shows a functional block diagram of one embodiment of an event dispatcher component useable within the real time asynchronous aggregation platform illustrated in FIG. 3.

FIG. 4 shows a functional block diagram of one embodiment 400 of an event dispatcher component useable within the real time asynchronous aggregation platform illustrated in FIG. 3. Dispatcher 308 of FIG. 4 may include many more or less components than those shown. The components shown, however, are sufficient to disclose an illustrative embodiment for practicing the invention.

As shown, dispatcher 308 may include listeners 402-403, event queue 406, relay consumer 408, and dispatch consumer 410. As events are received, one or more listeners 402-403 may receive the events from various event sources 401, including, but not limited to client devices 102-104, and content server 108 of FIG. 1; message server 254 of FIG. 2; another application; and/or another EAS. Such listeners may be configured to listen for incoming events from a particular source, from a particular transport mechanism, or even for a particular type of event. As such, listener 402 may be configured to receive incoming events, associated with, for example, spam reports, spam traps, a same content servers, a same target, a same source, or the like. Similarly, listener 403 may be configured to receive incoming events associated with, for example, not spam reports, a different content server, a different target, source, or the like. However, the invention is not so limited, and other implementations may be used. For example, a separate listener may be employed for each event. In another embodiment, a listener might be associated with events from a user, such as spam reports, not spam reports, spam traps, or the like, while another listener is configured to receive reports from a message server, or the like. In one embodiment, events may be time stamped as to when they are received. The events may also be stamped as to a source from which the event is received, or the like. In one embodiment listeners 402-403 may perform such stamping; however, event queue 406 may also be configured to perform such stamping.

Figure 5:
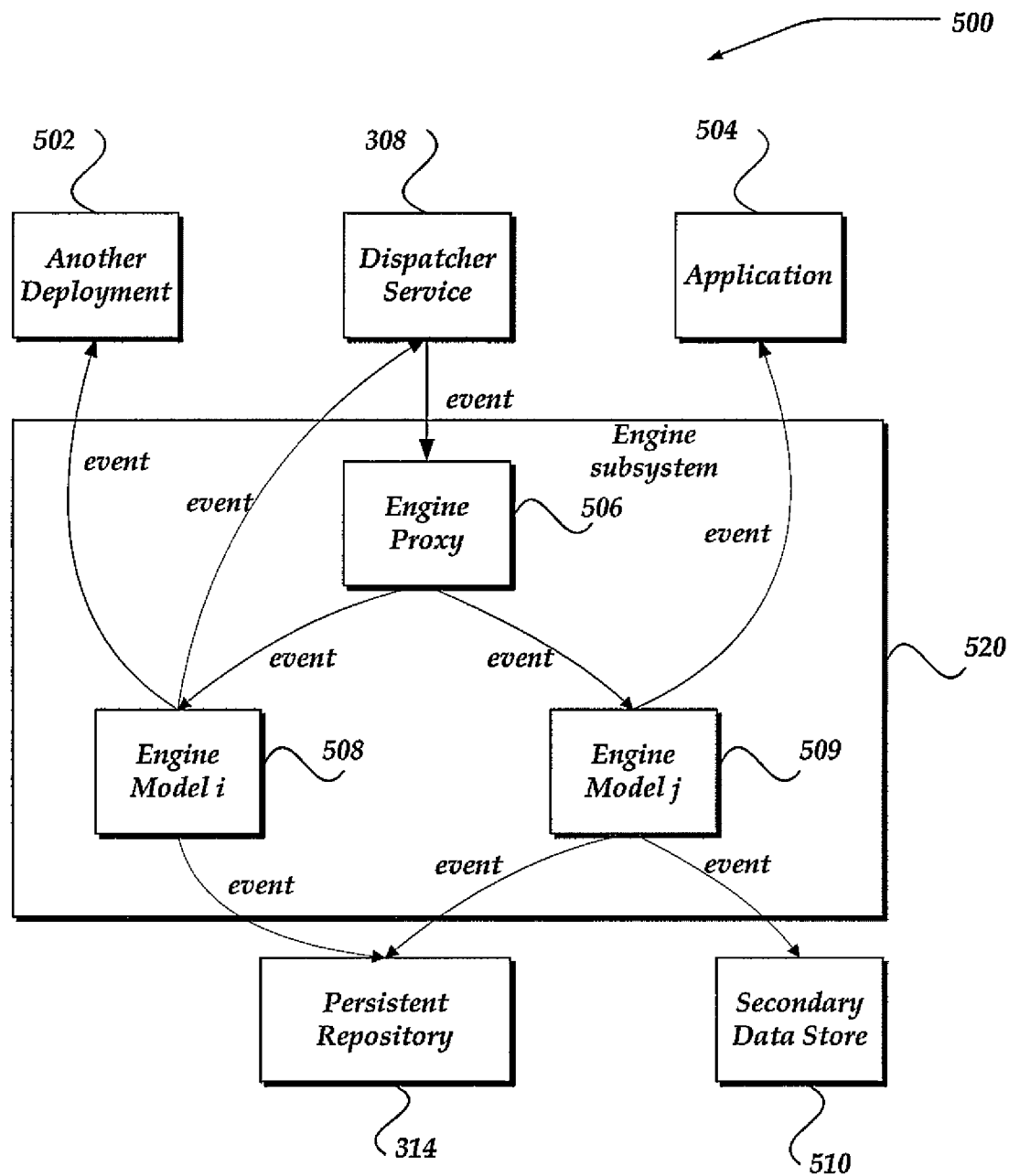
FIG. 5 shows a functional block diagram of one embodiment of an engine subsystem useable within the real time asynchronous aggregation platform illustrated in FIG. 3.

In any event, independent of how the incoming events are received, listeners 402-403 may then provide the events to event queue 406, where they may be consumed by consumer process 408 to be delivered to an optional secondary aggregation engine, or other aggregation engine, such as illustrated in FIG. 5. Similarly, the events in event queue 406 may also be consumed by dispatch consumer 410 which delivers the events to aggregation engine 310 of FIG. 3.

FIG. 5 shows a functional block diagram of one embodiment of an engine subsystem useable within the real time asynchronous aggregation platform illustrated in FIG. 3.

Thus, system 500 illustrates one possible implementation where dispatcher service 308 is configured and arranged to provide events to engine subsystem 510, which is configured to employ multiple engine models 508-509. As shown in FIG. 5, engine subsystem 520 may include engine proxy 506, and one or more engine models 508-509. Engine models 508-509 may be represent multiple versions of aggregation engine 310 of FIG. 3, or different implementations performing different reputation actions from each other. For example, in one embodiment, engine model 508 might be configured to determine whether messages are spam or not spam, while engine model 509 might be configured to determine a reputation for an author of content displayed by a content server.

Also illustrated in FIG. 5, engine models 508-509 may communicate information, such as events, to external applications 504, another deployment of a real time asynchronous aggregation platform, such as deployment 502, as well as provide events, and other data to persistent repository 314, and/or secondary data store 510. By providing events, and/or other data to the same persistent repository 314, in one embodiment, engine models 508-509 may also be configured to share the events and/or data with each other, build a common output structure, or the like.

Generalized Operation

Figure 7:
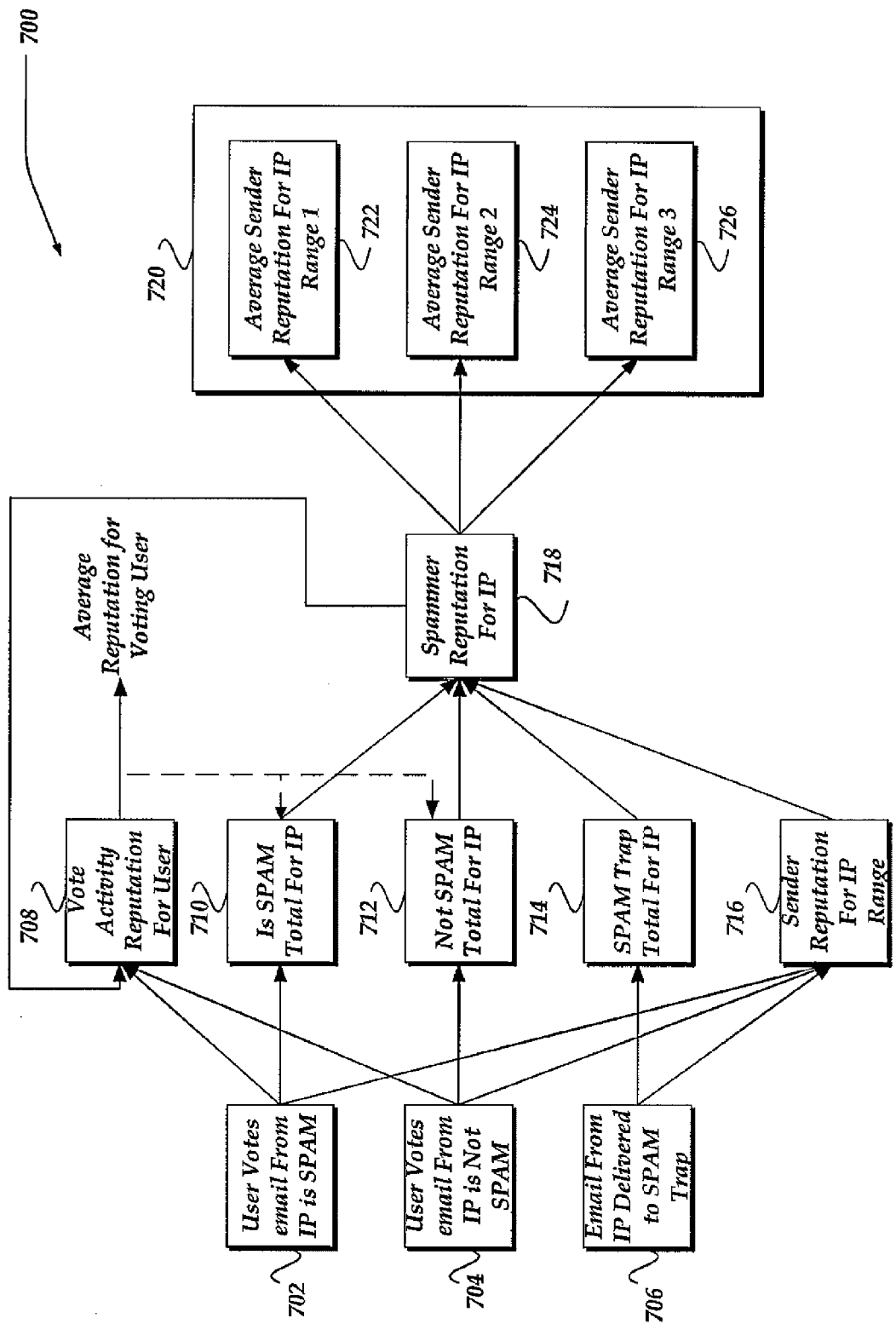
FIG. 7 illustrates a functional diagram generally showing one embodiment of an overview of asynchronous process useable in rapidly determining a reputation for a sender.

The operation of certain aspects of the present invention will now be described with respect to FIG. 7. FIG. 7 illustrates a functional diagram generally showing one embodiment of an overview of asynchronous process useable in rapidly determining a reputation for a sender. It should be noted that process 700 of FIG. 7 is just one example of an application for which the real-time asynchronous event aggregation system described above may be employed. Thus, such example is not to be construed as limiting the platform in any sense. In one embodiment, process 700 may be implemented as executable objects within an aggregator engine, such as aggregator engine 310 of FIG. 3.

As shown however, process 700 represents determining in real time a reputation of a message sender, such as email. The message sender's reputation may be determined based on an evaluation by the recipient of the message. The sender's reputation may be subsequently classified into various categories or ranges. In one embodiment, based on the classification various actions may be taken, including, but not limited to inhibiting another message to be sent to one of the identified users, sending a warning message to the sender of the message, revoking an account associated with the sender of the message, or even merely selecting to continue to monitor additional activities by the sender. As shown, a sender may be identified based on a variety of mechanisms, including, but not limited to a network address, such as an Internet Protocol (IP) address, a sender's user name, sender's user account, or the like.

Process 700 may begins with an input from any one or more of blocks 702, 704, and/or 706. At block 702, a user may receive a message, such as an email message, from a sender IP. The user may then determine based on a variety of criteria whether or not the message is spam, or not. In one embodiment, the user may determine that the message is spam and send a message to the real-time asynchronous event aggregation system so indicating that the message is spam. It should be noted, that another user, at block 704 might receive the same message from the same sender IP and determine that the message is not spam. The user in block 704 may so indicate through a variety of mechanisms that the message is not spam. In blocks 702 and 704, the users might receive and/or provide their determinations on the quality of the message at the same or different times. Moreover, the users may employ different or similar mechanisms to provide their determinations. For example, in one embodiment, a user interface might be provided to the users to enable the users to select an icon, or other input mechanism, to place their votes (determinations). Such inputs may also be determined automatically based on a variety of other mechanisms, including, but not limited to actions taken by the users, such as deleting the message without reading it, deleting the message after having read it, moving the message to a spam folder, moving the message to a save folder, or the like. In any event, such votes or determinations may operate as reputation events that indicate a value judgment by the users about the message and thus, a value judgment on the reputation of the message sender IP.

Block 706 is configured and arranged as a SPAM trap mechanism. As such, messages are not typically expected to be received by the SPAM trap. However, any message that is received is automatically interpreted as spam. Thus, if the sender IP sends the message to the SPAM trap, it triggers sending of a reputation event indicating that the sender IP sent spam. In one embodiment, such events might be separately managed. However, in another embodiment, such events could also be directed to block 710.

Asynchronous reputation events sent by blocks 702, 704, and/or 706 may be received by blocks 708, 710, 712, 714, and/or 716 as shown. Thus, if a reputation event is sent by block 702 it may be dispatched to blocks 708, 710, and 716. Similarly, a reputation event sent from block 704 may be dispatched to blocks 708, 712, and 716. Reputation events sent from block 706 may be sent to blocks 714 and 716. As such, reputation events may be dispatched, or fan-out, to multiple blocks.

Block 708 is configured and arranged to asynchronously determine a reputation of a user. Thus, in one embodiment, inputs from blocks 702 and 704 may be saved, and when a determination is made about the reputation of the sender (such as from block 718) it may be used to determine the user's reputation. For example, if several users identify a sender IP as not a spammer, then those user's that identified the sender IP as spam, might have a reputation that is viewable as "lower" than the other users that voted the sender IP as not a spammer. Other inputs, not shown, might also be used to determine at block 708, a user's reputation. For example, a sender might select to appeal their resulting reputation. If the appeal results in a change in the sender's reputation, this information might be used to also modify a user's reputation. For example, where a user voted that the sender IP is a spammer, but the result of the appeal changed the sender IP's reputation from that of a spammer to not a spammer. Then, the user's reputation might be 'diminished,' or determined to be less trustworthy. Thus, block 708 may monitor a user's voting activity to determine a user's reputation. In one embodiment, the user's reputation might be used to weight their inputs in the future. Thus, if a user has a 'low reputation' indicating that they have been incorrect with respect to the other users' inputs, then their next vote might be weighted lower than a vote from a user that correct with respect to the other users' inputs.

Block 710 is configured and arranged to asynchronously determine a count of the number of users that identified that the sender IP is a spammer (has sent a spam message). In one embodiment, block 710 might use a user's reputation to weight their count, as described above. The output of block 710 might then be provided to block 718.

Similarly, block 712 is configured and arranged to asynchronously determine a count of the number of users that identified that the sender IP is not a spammer (has sent a message that is determined not to be spam). As in block 710, in one embodiment, output from block 708 might be used to weight the user's vote. The output of block 712 may then be provided to block 718.

Block 714 is configured and arranged to asynchronously determine a count of the number of spam messages received by block 706 for sender IP. The output of block 714 may also be sent asynchronously to block 718.

Block 718 may asynchronously receive inputs from any one or more of blocks 710, 712, and/or block 714. That is, block 718 may make real-time determinations on a reputation of a sender IP independent of receiving inputs from each of blocks 710, 712, or 714. For example, it is not uncommon to receive less or even no inputs from a user indicating that a message is not spam. Thus, block 712 might receive no inputs, and thus provide, in one embodiment, no outputs. However, block 718 may still continue to determine the reputation for the sender IP independent of whether block 712 receives and/or sends an update.

Block 718 is configured and arranged to determine a single reputation for a sender IP based on one more inputs. Block 718 may in one embodiment, employ a running average of weighted totals to determine the sender IP's reputation. However, the invention is not constrained to such calculations, and any of a variety of mechanisms may be used to determine the sender IP's reputation. For example, inputs obtained during one time period might receive an overall weighting, while inputs received during another time period might be weighted differently. For example, early reputation event votes could get a higher (or lower) weighting than later reputation event votes. The output of block 718 may then be sent to block 720 based on a sender reputation classification. For example, if the reputation for the sender IP is below a first value, the results might be sent to block 722 within block 720, while if the reputation is above a second value, the results might be sent to block 726, and otherwise, the results might be sent to block 724. Thus, a reputation send to one of the blocks within 720 might be handled differently based on different rules. For example, in one embodiment, reputations within block 722 might be considered as not spammers, while those in block 726 might be considered as spammers. Based on a classification, in one embodiment, various actions might be taken, including, but not limited to inhibiting additional messages from the sender IP, deleting an account associated with the sender IP, or the like.

Also illustrated in process 700 is block 716. Block 716 may be configured and arranged to receive inputs from one or more of block 702, 704, and/or 706, and to determine a range of sender IPs, such as might be associated with a network's sub-network of addresses, or the like. The range of network addresses, or IPs, might be useable, based on the votes, to determine a reputation for a range of sender IPs. For example, it might be found that a several sender IPs within a sub-network of addresses are voted as spammers. The results from process 700 might then classify sender IPs within the identified sub-network range as spammers, even if a reputation event does not specifically identify the IP address as a source of spam. In this manner, blocks of sender IP addresses might be inhibited from sending messages to users, or the like.

It will be understood that each block of the illustration, and combinations of blocks in the illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause operational steps to be performed by the processor to produce a computer implemented process such that the instructions, which execute on the processor to provide steps for implementing the actions specified in the block or blocks. In one embodiment, at least some of the operational steps may be performed serially; however, the invention is not so limited, and at least some steps may be performed concurrently.

Accordingly, blocks of the illustration support combinations of means for performing the specified actions, combinations of steps for performing the specified actions and program instruction means for performing the specified actions. It will also be understood that each block of the illustration, and combinations of blocks in the illustration, can be implemented by special purpose hardware-based systems which perform the specified actions or steps, or combinations of special purpose hardware and computer instructions.

Alternative Embodiments

It should be noted that the above described real time asynchronous aggregation platform may be employed for determining reputations for a variety of other application beyond that of a email message sender's reputation. For example, the real time asynchronous aggregation platform may be employed to determine reputations for movies, authors of blogs, or other articles, cars, or any of a variety of a target of interest.

Therefore, in a more general context, events such as described above, may be represented generally by a reputation statement. A reputation statement may typically include an action by a source, such as a user, that submits values in a particular context for a target, such as a user generated content or product. Statements may be sent asynchronously to the real time asynchronous aggregation platform. A reputation engine within the real time asynchronous aggregation platform may then process the statement by calculating a target's reputation score and storing the result in a reputation repository; the events may also be optionally stored as well.

In the statement, in one embodiment, a method parameter may be included that specifies which model and/or method in the engine will do the processing. In one embodiment, a reputation statement may describe an event as a source, such as a user, makes a value judgment, or claim, about a target, such as a product or some user generated content. For example, in one embodiment, user "A" (the source) give 4 out of 5 stars (the claim) to the movie XYZ (the target).

The reputation engine, in one embodiment, such as described above, combines, or rolls up the claim values to determine the target's reputation score for each of its reputation attributes. The model may then, in one embodiment, define a formula, or the like, and which reputation attributes to update for the target.

Moreover, in one embodiment, a reputation statement may include several types of claims, including, but not limited to quantitative, normalized, or composite. A quantitative claim may assign a numeric value to the target. A normalized claim might assign a numeric value within a specified range, while a composite claim may assign two or more key value pairs to a target. For example, price=1, service=3, or the like.

In any event, the reputation engine may be configured to receive a reputation statement including one or more of the above types of claims, and to operate in real time upon the received reputation statements to determine a reputation for the target. Thus, the real time asynchronous aggregation platform may be employed for a large variety of different reputation applications, or the like.

The above specification, examples, and data provide a complete description of the manufacture and use of the composition of the invention. Since many embodiments of the

What is claimed as new and desired to be protected by Letters Patent of the United States is:

1. A method comprising:
   receiving, by a processor, at least one reputation event that comprises at least a statement about a value associated with a target;
   determining, by the processor, a reputation score for the target by asynchronously operating on the received at least one reputation event independent of waiting for another reputation event, wherein the asynchronous operation comprises:
      assigning, by the processor, weight to the at least one reputation event based on a time at which the at least one reputation event is received; and
      performing, by the processor, at least a running reputation determination for the reputation score by employing the assigned weight;
   causing, by the processor, a display of the reputation score, wherein the reputation score indicates a collective value of the target based in part on a plurality of reputation events received over time.

2. The method of claim 1, wherein the running reputation determination includes a running average computation using previously received reputation events.

3. The method of claim 1, wherein the at least one reputation event is associated with a vote from a user indicating whether a message is or is not SPAM.

4. The method of claim 3 wherein the target is a sender of the message and the at least one reputation score indicates whether the message sender is a SPAMMER.

5. The method of claim 1 wherein the target is a movie and the at least one reputation event is associated with a rating by a user of the movie, and the reputation score indicates a resulting score for the movie based on input reputation events from a plurality of different users.

6. The method of claim 1 wherein the at least one reputation event comprises information indicating a source of the reputation event, a claim about the target and the target.

7. The method of claim 1, wherein the at least one reputation event is associated with a message sent to a SPAM trap address configured and arranged such that only SPAM messages are sent to the SPAM trap address, and wherein each reputation event from the SPAM trap address indicates that a sender of the message is a SPAMMER.

8. The method of claim 1 wherein the target comprises content reviewed by a user.

9. The method of claim 1, further comprising:
   determining asynchronously, by the processor, absent waiting for another reputation event, a count for whether the target is a SPAMMER.

10. The method of claim 1, further comprising:
    determining asynchronously, by the processor, absent waiting for another reputation event, a count of messages received by a SPAM trap address indicating that the target is a SPAMMER.

11. The method of claim 1 method, wherein the at least one reputation event comprises two reputation events and assigning weight to the at least one reputation event further comprises:
    assigning, by the processor, a higher weighting an earlier received reputation event of the at least one reputation event and a lower weighting to a later received reputation event of the at least one reputation event.

12. The method of claim 1, wherein the at least one reputation event provides a composite claim that comprises a plurality of numeric values assigned to a plurality of reputation attributes.

13. The method of claim 12, wherein determining a reputation score for the target further comprises:
    combining, by the processor, respective values of each of the plurality of reputation attributes.

14. An apparatus comprising:
    a processor; and
    a non-transitory processor readable storage medium comprising programming logic executable by the processor, the programming logic comprising:
    receiving logic, executed by the processor, for receiving at least one reputation event that comprises at least a statement about a value associated with a target;
    determining logic, executed by the processor, for determining a reputation score for the target by asynchronously operating on the received at least one reputation event independent of waiting for another reputation event, wherein the determining logic executing the asynchronous operation comprises logic for:
       assigning weight to the at least one reputation event based on a time at which the at least one reputation event is received;
       performing at least a running reputation determination for the reputation score by employing the assigned weight; and
    display causing logic, executed by the processor, for causing a display of the reputation score, wherein the reputation score indicates a collective value of the target based in part on a plurality of reputation events received over time.

15. The apparatus of claim 14, wherein the determining logic further comprises:
    logic executed by the processor for computing a running average of the reputation score using reputation events received prior to the at least one reputation event.

16. The apparatus of claim 14, wherein the target is a message received by a user and the at least one reputation event is a vote from the user indicating whether the message is SPAM.

17. The apparatus of claim 14, wherein the at least one reputation event comprises information indicating a source of the reputation event, a claim or value judgment about the target, and the target.

18. A non-transitory computer readable medium comprising processor-executable instructions for:
    receiving at least one reputation event that comprises at least a statement about a value associated with a target;
    determining a reputation score for the target by asynchronously operating on the received at least one reputation event independent of waiting for another reputation event, wherein the asynchronous operation comprises
       assigning weight to the at least one reputation event based on a time at which the at least one reputation event is received;
       performing at least a running reputation determination for the reputation score by employing the assigned weight; and
    causing a display of the reputation score, wherein the reputation score indicates a collective value of the target based in part on a plurality of reputation events received over time.

19. The computer readable medium of claim 18, wherein the running reputation determination includes a running average computation using previously received reputation events.

20. The computer readable medium of claim 18 wherein the at least one reputation event is associated with a rating by a user of a target movie, and the reputation score indicates a resulting score for the target movie based on input reputation events from a plurality of different users.

* * * * *